E. HARTUNG.
BUTTER CUTTING MACHINE.
APPLICATION FILED AUG. 31, 1921.
1,430,078.  Patented Sept. 26, 1922.
2 SHEETS—SHEET 2.
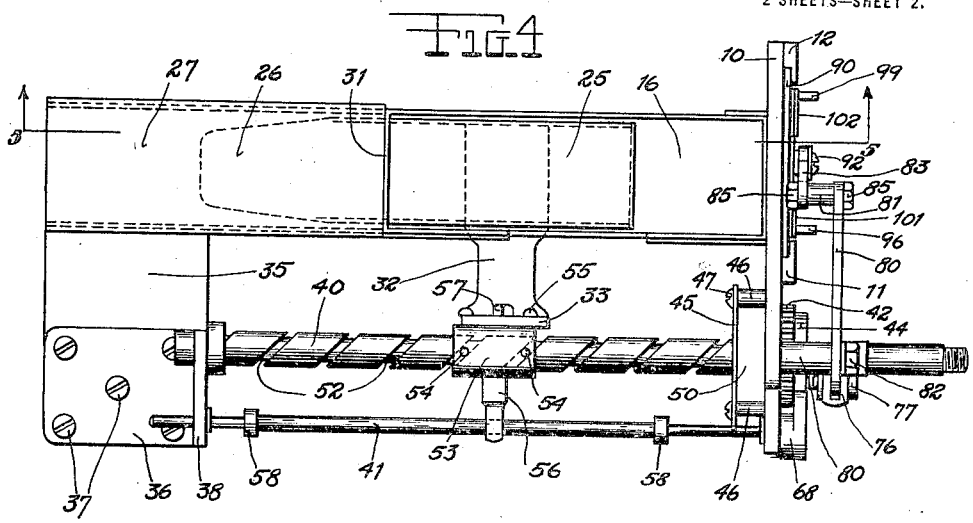
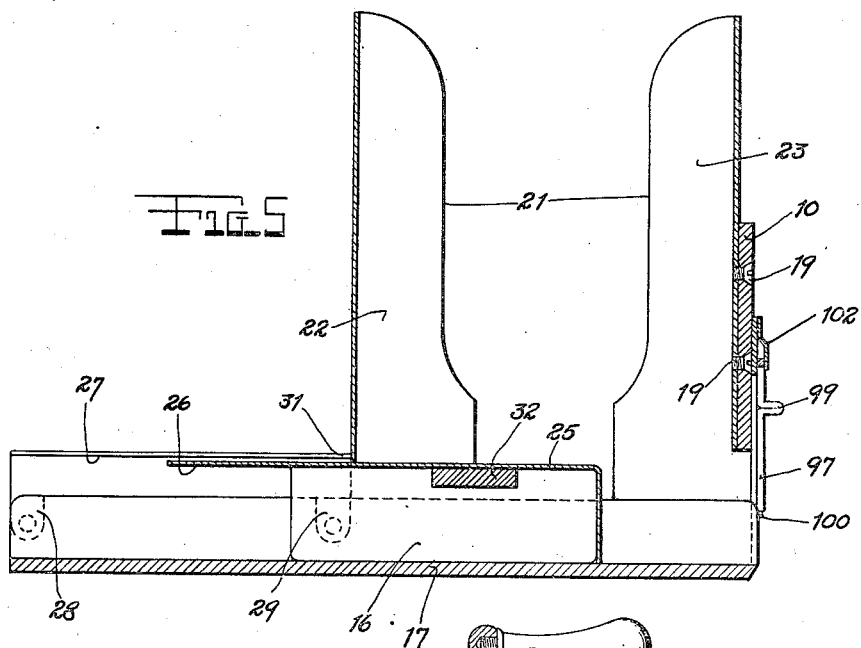
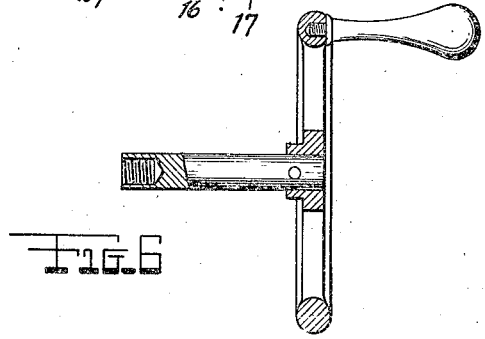
INVENTOR
E. Hartung
BY
ATTORNEY Patented Sept. 26, 1922.

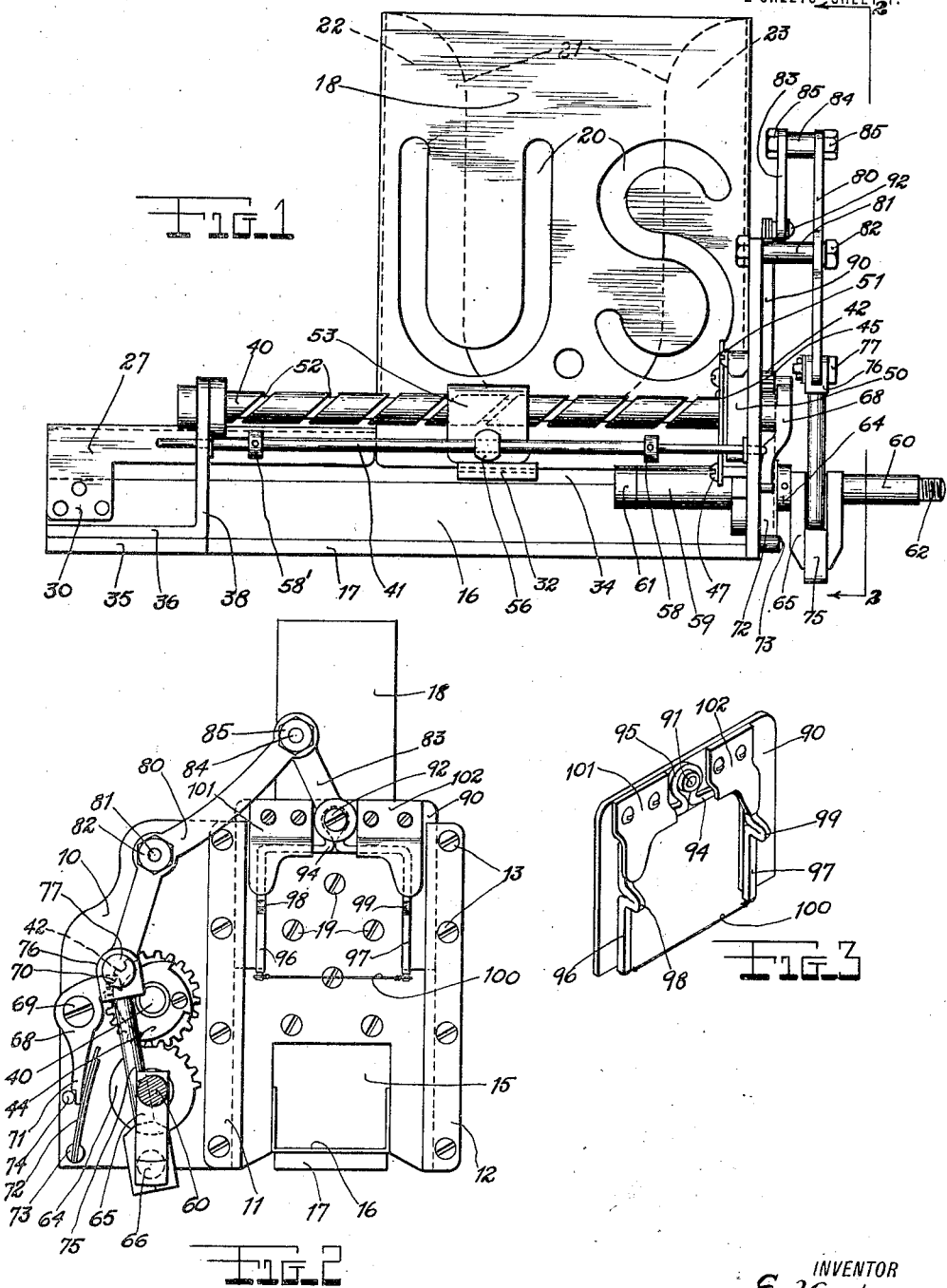

1,430,078

UNITED STATES PATENT OFFICE.

EDMUND HARTUNG, OF JERSEY CITY, NEW JERSEY.

BUTTER-CUTTING MACHINE.

Application filed August 31, 1921. Serial No. 497,337.

*To all whom it may concern:*

Be it known that I, EDMUND HARTUNG, a citizen of Poland, residing at Jersey City, in the county of Hudson and State of New Jersey, have invented certain new and useful Improvements in Butter-Cutting Machines, of which the following is a specification.

One of the objects of this invention is to provide a butter cutting machine adapted to be attached to the inside of an ice box or to the table as desired.

Another object is the means provided by which a broken mass of butter placed in the hopper, is automatically formed into rectangular prints and moved forward a definite predetermined amount for each revolution of the operating handle.

A third object is the means employed for returning the print forming mechanism to normal position when the supply of butter in the hopper is exhausted.

These and other objects are attained by the novel construction and arrangement of parts hereinafter described and shown in the accompanying drawings, forming a material part of this disclosure, and in which:—

Figure 1 represents a side elevational view of this invention.

Figure 2 is a partial sectional front elevational view of same, taken on the line 2—2 of Figure 1.

Figure 3 is a perspective view of the butter cutting frame.

Figure 4 is a top plan view.

Figure 5 is a longitudinal sectional view taken on the line 5—5 of Figure 4.

Figure 6 is a partial sectional view of the operating wheel and shaft.

Referring to the figures in detail, the numeral 10 designates a frame, to which are attached the guide bars 11 and 12 by the screws 13.

A rectangular opening 15 is positioned centrally between the bars 11 and 12 and allows a mold trough 16 to be enterable therein. The opposite end, extending the full length of the machine, is supported by a stiffening bar 17 rigidly attached thereto and forming a base on which the machine rests and is secured.

A hopper 18, vertically disposed and in alignment with the opening 15, is secured to the back of the frame 10 by the screws 19, and is provided in one of its side faces with perforations 20 for viewing the contents. The opposite side is open in the general form of a wide slot, as at 21 of the Figure 5. The ends of these sides 22 and 23 extend downward to the lower edge of the trough 16 and are riveted thereto, the ends being open for the introduction and passage of the butter through the hopper into the mold trough 16.

An oblong rectangular ram 25, slidable within the trough 16, has an extending top 26 serving as a guide and is prevented from raising, in its passage through the trough, by the cover 27, which is secured to the outer sides of the trough by screws engaging through the projecting ears 28—29—30. The forward edge 31 of the cover acts as a scraper for removing any butter adhering to the top of the ram.

An arm 32 is fixed to the front side of the ram and extends forward terminating in an upturned plate element 33, the arm moving laterally within a slot 34 formed between the upper front edge of the trough 16 and the lower front edge of the hopper.

Integral with the stiffening bar 17 and extending forward at a right angle thereto, is a bracket plate 35, to which is attached a supporting bracket 36, by the screws 37. The upright element 38 is provided with bearings within which are rotatably mounted the ends of the feed rod 40 and the ratchet release rod 41. These rods are disposed parallel to one another, longitudinally of the machine and pass through bearings provided in the frame 10.

A gear 42 is secured to the projecting end of the rod 40, adjacent the outer face of the frame 10, and a four toothed ratchet 44 is secured to the outer face of the gear 42.

An annular disc 45 positioned concentric with the rod 40 and at spaced distance from the inner face of the frame 10 by the bushings 46 and there held by the screws 47, forming a retaining frame for a spiral spring 50, the inner end of which is attached to the rod 40 while the outer end is held by a screw 51 threadably engaged in the frame 10.

Formed on the rod 40 is a narrow spiral groove 52 acting in the manner of a coarse pitch screw thread adapted to move longitudinally.

A nut 53 comprising a block provided with a pair of radially positioned pins 54 engaging in the grooves 52, and the nuts are adjustably secured to the upturned element 33 of the arm 32 by the screws 55, lateral movement thereby being transmitted to the ram 25 by rotation of the feed rod 40. A stud 56 is secured through the block 53 and the arm 33 by a nut 57. The opposite end of the stud extends forward and is provided with an opening slidably engaging the release rod 41 on which is fixed a pair of stops 58 and 58' limiting the travel of the nut 53.

Secured to the inner face of the frame 10 is a projecting sleeve 59 in horizontal alignment with and below the rod 40.

A single throw crank shaft 60, one end projecting through the frame 10 and the sleeve 59, is rotatably held by the collar 61 pinned therewith, the opposite end of the shaft terminating as a threaded element 62 engageable with the handle combination, as shown in Figure 6.

A segmental gear 64 is secured to the crank shaft 60 between the check element 65 and the frame 10.

The toothed portion of this gear is in mesh with the gear 42 during a part of its revolution and is definitely positioned on the crank shaft 60 with respect to the position of the crank pin 66.

A pawl 68 is pivotally attached to the frame 10 by a shoulder screw 69, and is formed with a hooked element 70 adapted to engage the toothed ratchet 44.

A tail element 71 extends downward from the pawl body and is pressed outward by a flat spring 72 rigidly secured by a stud 73 fixed in the frame 10, a stop pin 74 is provided, limiting the movement of the pawl.

On the back of the pawl tail 71 is an angular cam element forming an incline adapted to be engaged and depressed by the action of the sliding release rod 41 impinging thereagainst. Upon depression of the pawl, the ratchet 44 is released and the spring 50, if under tension, is free to unwind.

Rotatably secured to the crank pin 66 is a crank arm 75, the upper end terminating in a forked head 76. A pivot pin 77 is secured therein and engages one end of a lever 80 which is pivotally mounted on a stud 81 secured through the frame 10, the lever being held in place by the nut 82 threadably engaging the stud 81.

The opposite end of the lever 80 is pivotally connected to link 83 by a stud 84 separating the lever and link a spaced distance apart; nuts 85 and 85 are provided for retaining the parts in place.

Sliding vertically within the guides 11 and 12 and adjacent the frame 10, is a frame 90 comprising a pair of side elements and a cross bar top, the central portion being provided with an outstanding stud 91, interiorly screw threaded and adapted to engage a shoulder screw 92 passing through the lower end of the link 83 and into the stud 91.

A spring frame 94 made of wire having a square cross section and comprising essentially a central loop 95 enclosing the stud 91, a pair of downwardly depending spring arms 96 and 97. Tightly folded loops 98 and 99 project forward from each of the spring arms forming means by which spring frame arms 96 and 97 may be pressed toward one another when connecting the silver cutting wire 100 to the ends of the arms; on releasing the loop handles, tension is communicated to cutting wire drawing it taut.

Offset spring clips 101 and 102 hold the wire frame 94 tensionally against the sliding frame 90.

In operation, a mass of butter placed within the hopper and pressed down into the trough is forced forward by the ram traveling within the trough, its movement being accomplished by means of a nut connected by an arm to the ram and also by engagement with the spirally grooved feed rod, intermittently rotated by a gear fixed thereon and meshing with a segmental gear secured to the crank shaft.

A hand wheel is removably attached to the outer end of the crank shaft and provides the initial means for operating the device.

To each complete revolution of the crank shaft and segment gear, the feed shaft and gear is caused to turn one quarter of a revolution, simultaneously with the disengagement of the segment gear from the feed gear. A spring actuated pawl comes into engagement with a four toothed ratchet fixed to the feed gear and preventing further movement until the segment gear is again in mesh with the feed gear. A flat spiral spring is positioned on the opposite side of the frame, the outer end being attached to the frame and the inner end fixed to the feed rod, rotation of which causes the spring to wind about the rod, tension being retained by the pawl previously mentioned.

The feed rod is provided with a spiral groove of coarse pitch and a nut engaging the grooves traveling along the rod. An extending stud fixed on the nut, slidably engages a release rod, provided with stops adapted to engage contactable with the stud in the nut.

Further advancement of the nut causes the release rod to engage and depress the pawl, thus releasing the ratchet and the spring, being under tension, rotates the rod in reverse direction carrying the nut and ram combination toward the rear of the machine.

During a period of time in which the segmental gear is out of meshed engagement, a frame carrying the cutting element, is given vertical reciprocating motion by means of levers operated by a crank arm connected to the crank shaft.

While certain preferred embodiments of this device have been shown and described, it will be understood changes in the form, arrangements, proportions, sizes and details thereof may be made without departing from the scope of the invention as defined in the appended claims.

Having thus described my invention, what I claim as new and desire to secure by Letters Patent, is:—

1. In a butter cutting machine, a frame, a hopper, a trough, a ram within said trough, a spirally grooved rod, means therewith for operating said ram, a spring coacting between said frame and ram, means for winding said spring, and other means for automatically releasing said spring and returning said ram to normal outward position.

2. In a butter cutting machine, the combination with a frame, of an auxiliary frame slidable thereon, guides for controlling its movement, spring clips on said auxiliary frame engaging a spring tensioning frame, looped means forming handles for compressing the ends of said tensioning frame, a cutting element, eyes formed at the ends of said cutting element adapted to engage the ends of said tensioning frame, and lever means for causing reciprocating motion of the auxiliary frame.

3. In a butter cutting machine, a frame, a hopper secured to said frame, a trough below said hopper, a ram operable in said trough, a securing bar fixed to said trough, a bracket on said bar, a spirally grooved feed rod, a gear attached to said feed rod, a ratchet fixed to said gear, said feed rod passing through said frame and said bracket, and means engaging said spiral grooves for operating said ram.

4. In a butter cutting machine, the combination of a butter cutting means, said means consisting of a silver wire, eyes formed thereon, a resilient frame, a spring loop central of said frame, downward depending spring arms, notches at ends of said arm for engaging said wire, clips for securing said resilient frame adjacent an auxiliary frame, and means for communicating vertical reciprocating motion thereto.

5. In a butter cutting machine, the combination of a frame, a crank shaft rotatable therethrough, a segmental gear on said crank shaft, a feed gear engaging said segmental gear, a ratchet secured to said feed gear, a feed rod secured to said feed gear and said ratchet, a spring locking pawl engaging said ratchet, a releasing bar, means co-acting with said feed rod and release bar for disengaging said pawl from said ratchet, and means with said crank shaft for intermittently causing said feed rod to rotate, and other means with said crank shaft for causing a cutting means to operate in timed relation to the movement of said feed rod substantially as described.

In witness whereof I affix my signature.

EDMUND HARTUNG.